United States Patent [19]

Bühler

[11] 4,406,538
[45] Sep. 27, 1983

[54] METHOD AND ARRANGEMENT FOR AUTOMATIC EXPOSURE CONTROL IN COLOR COPIERS

[75] Inventor: Rudolf Bühler, Munich, Fed. Rep. of Germany

[73] Assignee: Agfa-Gevaert Aktiengesellschaft, Leverkusen, Fed. Rep. of Germany

[21] Appl. No.: 333,469

[22] Filed: Dec. 22, 1981

[30] Foreign Application Priority Data

Dec. 23, 1980 [DE] Fed. Rep. of Germany ....... 3048729

[51] Int. Cl.$^3$ ............................................. G03B 27/73
[52] U.S. Cl. ........................................ 355/37; 355/38; 355/77
[58] Field of Search ................... 355/35, 36, 37, 38, 355/77

[56] References Cited

U.S. PATENT DOCUMENTS 4,192,605 3/1980 Fergg et al. ........................ 355/38

Primary Examiner—Michael L. Gellner
Attorney, Agent, or Firm—Kontler, Grimes & Battersby

[57] ABSTRACT

A color copier has a control circuit for controlling the exposure of an original to be copied. The control circuit has a processing channel for each of the three primary colors. Each of the channels is associated with photodetectors which is sensitive to the color of the respective channel. The photodetectors sense the intensity of the light in the respective color transmitted through the original and generate signals indicative of the density of the original in that color. The density of the original in each color is compared with the neutral gray density of the original. The difference between the density of each color and the neutral gray density is used to calculate an undercorrection factor for the respective color. The undercorrection factor is used to regulate the exposure time for light of the respective color or the intensity of light of the respective color during exposure. The undercorrection factor lies on a graph of undercorrection factor versus difference between the respective color density and the neutral gray density having at least one change in slope. The slope may change continuously or at a threshold value on the difference axis. The magnitude of the undercorrection factor increases more rapidly after passing through a change in slope in a direction of increasing difference than before. Regulation of the exposure of an original in the above manner makes it possible to at least partially eliminate in the copy sharp color contrasts which appear in the original while simultaneously obtaining good reproductions of color dominants which appear in the original.

38 Claims, 5 Drawing Figures

METHOD AND ARRANGEMENT FOR AUTOMATIC EXPOSURE CONTROL IN COLOR COPIERS

BACKGROUND OF THE INVENTION

The invention relates generally to color copying.

More particularly, the invention relates to a method and an arrangement for automatic exposure control in color copiers, especially photographic color copiers.

The so-called neutral gray correction is employed with advantage when making copies of a colored original, that is, a color negative or positive, having sharp color contrasts. When using the neutral gray correction, the exposures in the individual colors are controlled in such a manner that the copy as a whole has a neutral gray density. The neutral gray correction is based on the recognition that better results are obtained when originals having sharp color contrasts are exposed so as to yield neutral gray copies than when these are exposed so as to reproduce the color variations of the originals on the copies. However, as the materials for the originals continue to improve, color contrasts become less and less pronounced. As a result, the so-called dominants due to the object imaged onto the original are suppressed when the neutral gray correction is used so that unsatisfactory reproductions of the colors are achieved. The reproductions of the colors are improved by means of an undercorrection.

In view of the above, most modern color copiers are designed for color undercorrection. A predetermined percentage of the full undercorrection factor is used and, although adjustable, generally remains unchanged during the processing of a series of originals. A color copier of this type is disclosed, for example, in the U.S. Pat. No. 3,867,029.

Neutral gray correction and undercorrection are mutually exclusive in that one increases as the other decreases. Thus, in establishing the percentage of the undercorrection factor to be used, it is necessary to compromise between the color contrasts which it is desirable to eliminate by means of the neutral gray correction and the color dominants which it is desirable to retain to the extent possible, that is, which are to be copied with a high degree of undercorrection. This compromise regularly causes difficulties, particularly when a roll containing sections of film which have different color compositions or which must be pretreated differently are to be processed in an automatic color copier.

OBJECTS AND SUMMARY OF THE INVENTION

It is an object of the invention to provide an exposure control method which makes it possible to obtain better copies than previously.

Another object of the invention is to provide an exposure control method which may be readily used in automatic color copiers.

An additional object of the invention is to provide a color copier which makes it possible to produce better copies than heretofore.

A concomitant object of the invention is to provide a color copier which is simple to operate.

It is also an object of the invention to establish a relationship for color undercorrection which makes it possible to eliminate sharp color contrasts at least to a large degree while nevertheless permitting better reproduction of color dominants than is achieveable with a constant undercorrection factor for a series of originals.

The above objects, as well as others which will become apparent as the description proceeds, are achieved by the invention.

The invention is based on the premise that those deviations of the individual color densities of an original from the gray density thereof which are generally caused by the masks applied to the original or by sharp color contrasts in the original are relatively small. The invention is further based on the premise that the color dominants which are present in addition to the sharp color contrasts in the original are responsible for substantially greater deviations of the average individual color densities of the original from the gray density of the latter.

One aspect of the invention resides in an exposure control method for color copying which is particularly well-suited for use in automatic exposure control of photographic color copiers. The method involves determining both the average color density of a predetermined color and the average neutral gray density of an original to be copied. The deviation of the color density from the neutral gray density is established. The exposure of the original in the predetermined color during copying is controlled in dependence upon the deviation using a correction factor from a graph of correction factor versus deviation having at least one change in slope.

The preceding steps are advantageously performed for each of three colors of the original, e.g. red, green and blue.

In a preferred embodiment of the invention, an undercorrection factor is used and has a magnitude which increases more rapidly with increasing deviation after passing through the change in slope in a direction of increasing magnitude of deviation than before. In other words, the preferred embodiment of the invention provides an undercorrection factor which exceeds conventional undercorrection factors over at least a portion of the total range of deviation. Due to this increase in the undercorrection factor, large deviations of the density of a color from the neutral gray density resulting almost exclusively from a dominant are subjected to a relatively small neutral gray correction, that is, are reproduced relatively strongly. On the other hand, relatively small deviations resulting mainly from sharp color contrasts or a very weak dominant undergo a relatively large neutral gray correction. Accordingly, the percentage of satisfactory copies obtained from a batch of originals is larger than when using a constant correction or undercorrection factor for a series of originals.

Another aspect of the invention resides in a color copier which is particularly well-suited for photographic color copying. The copier comprises means for determining the average color density of a predetermined color and the average neutral gray density of an original to be copied. The copier further includes means for establishing the deviation of the color density from the neutral gray density and assigning a correction factor from a graph of correction factor versus deviation having at least one change in slope. Means is provided for controlling the exposure of the original in the predetermined color during copying using the preceding correction factor.

A preferred embodiment of the copier has three color channels, e.g. red, green and blue, each of which is provided with the determining means, establishing and assigning means and controlling means set forth above.

The color channels may each include at least one photodetector which is sensitive to the color of the corresponding channel and is exposed to light which has passed through the original. The photodetectors may emit signals which serve to regulate the exposures in the respective colors. The exposures may be controlled in such a manner that, depending upon the correction factor which is used, the deviations of the individual average color densities from the neutral gray density of the original are entirely reproduced in the copy (full undercorrection or zero percentage neutral gray correction) or at least partly eliminated so as to produce a neutral gray copy (full or 100% neutral gray correction).

The method and copier of the invention may be used for automatic exposure control during color copying.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
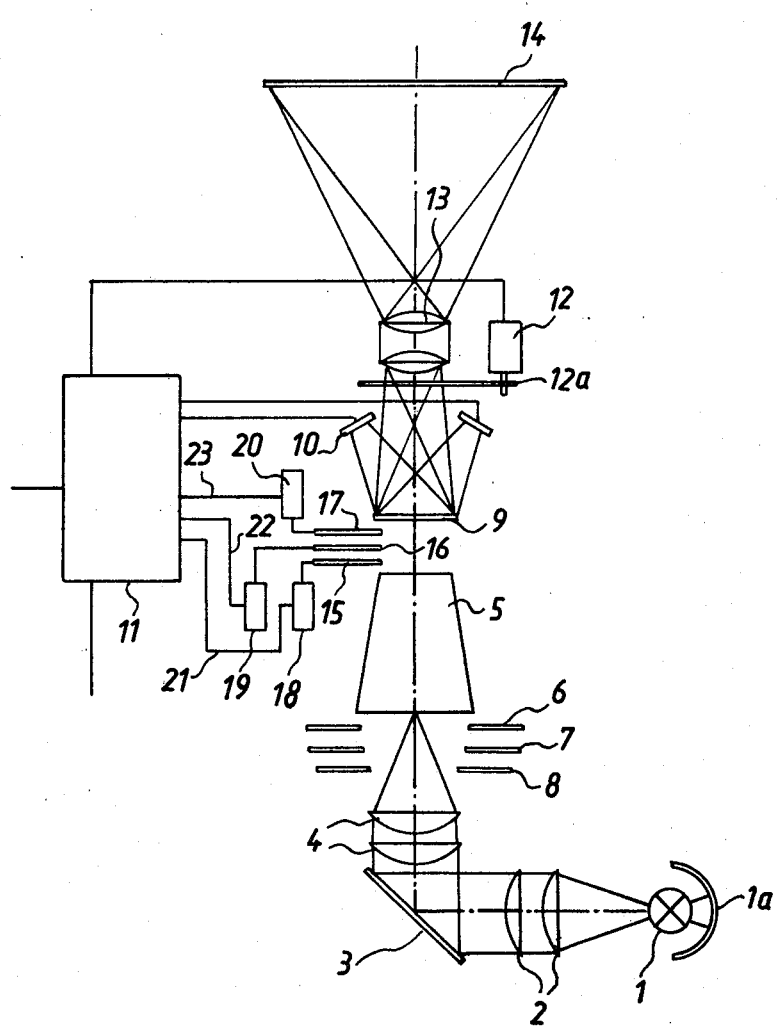
FIG. 1 schematically illustrates a color copier according to the invention.

FIG. 1 illustrates a color copier having a source 1 of printing light which emits light in all required wavelengths. A reflector 1a is disposed behind the light source 1. Light from the source 1 travels through twin lenses 2 to a cold light reflector 3. The light is deflected by the reflector 3 to a second set of twin lenses 4 and then enters a light mixing duct 5. A set of complementary color filters 6,7 and 8, e.g. red, green and blue, is situated between the lenses 4 and the light mixing duct 5. The filters 6-8 can be moved into and out of the path of the light so as to change the color of the same. The extent to which the filters 6-8 are moved into the path of the light depends upon the sensitivity of the printing material. Thus, the filters 6-8 change the color of the printing light issuing from the light source 1 as a function of the sensitivity of the printing material. The light mixing duct 5 uniformly mixes the colored light which has passed through the filters 6-8 so that the light which reaches an original 9 to be copied has uniform intensity and color distribution. The original 9 is here assumed to be a transparency such as a photographic negative.

Photodetectors 10 are located downstream of the original 9 as considered in the direction of travel of the light. Each of the photodetectors 10 is sensitive to a specific color of light, e.g. red, green or blue. This is achieved by means of color filters which are not illustrated. The photodetectors 10, which are preferably silicone detectors, are located ouside of the main path of the light, that is, the path which is followed by the light which travels to the printing material. However, the photodetectors 10 are exposed to scattered light from the original 9. The photodetectors 10 are connected to a switching circuit 11 which will be described in detail with reference to FIGS. 2 and 4.

A shutter 12a is located behind the photodetectors 10 as considered in the direction of propagation of the light. The shutter 12a is controlled by a relay 12 which is capable of moving the shutter 12a into and out of the main path of the light. The relay 12 is also connected to the switching circuit 11.

Downstream of the shutter 12a is an objective lens 13 which focuses the image from the original 9 onto light sensitive printing material 14. The printing material 14 may, for instance, be in the form of a roll which is held by a pair of reels and is automatically moved after each exposure so that an unexposed portion thereof comes into register with the path of the light issuing from the lens 13. The characteristics of the printing material 14 play an important roll in the adjustment of the switching circuit 11.

A second set of complementary color filters 15,16 and 17, e.g. red, green and blue, is located between the light mixing duct 5 and the original 9. The filters 15-17 are respectively connected to relays 18,19 and 20 which serve to move the filters 15-17 into and out of the path of the light along non-illustrated guides. The relays 18-20 are, in turn, connected to the switching circuit 11 via lines 21,22 and 23, respectively.

The filters 15-17 function to terminate the exposure of the original 9 in the respective color when moved into the path of the light. The relays 18-20 move the filters 15-17 into the path of the light in response to signals from the switching circuit 11.

The copier of FIG. 1 is similar to that disclosed in U.S. Pat. No. 3,867,029. However, the switching circuit 11 for the copier of FIG. 1 differs from the switching circuit of the patent.

Figure 2:
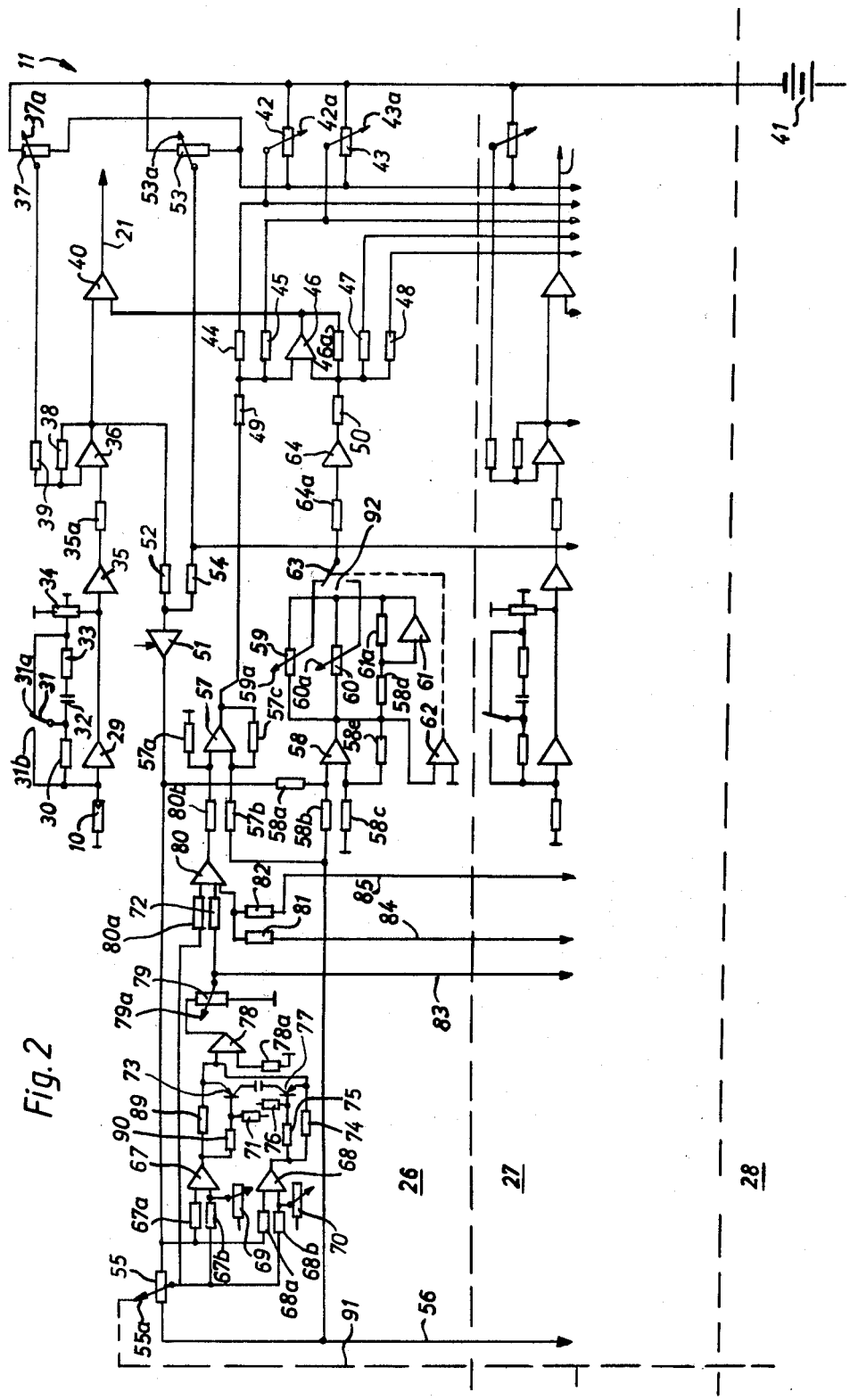
FIG. 2 shows one embodient of a circuit for use in the copier of FIG. 1.

FIG. 2 illustrates the details of one embodiment of the switching circuit 11. The switching circuit 11 includes three color channels 26,27 and 28, e.g. red, green and blue, in which the signals for the respective color are processed. Since the color channels 26-28 are identical, only the color channel 26 is shown and described in detail.

Each of the color channels 26-28 is connected with several, e.g. four, of the photodetectors 10. The photodetectors 10 for the respective color channels 26-28 are uniformly distributed around the circumference of the original 9. Since the photodetectors 10 corresponding to each of the color channels 26-28 are arranged in parallel, FIG. 2 illustrates only a single photodetector 10 for the color channel 26.

An operational amplifier 29 is directly connected to the photodetectors 10 for the color channel 26 and is located in close proximity to these photodetectors 10. The operational amplifier 29 has a negative feedback circuit which includes a resistor 30 and an RC link constituted by a condenser 32 and a resistor 33. A switch 31 in the negative feedback circuit had a tap which is situated between the resistor 30 and the RC link 32,33. The switch 31 is movable between a position 31a in which the resistor 30 is in circuit with the operational amplifier 29 and a position 31b in which the RC link 32,33 is in circuit with the operational amplifier 29. The negative feedback circuit of the operational amplifier 29 further includes a potentiometer 34 which functions to compensate for changes in format.

The output of the operational amplifier 29 is connected with a logarithmic amplifier 35. The output of the logarithmic amplifier 35 is, in turn, connected to one of the two inputs of a summing amplifier 36 via a resistor 35a. The other input of the summing amplifier 36 is connected with the wiper 37a of a potentiometer 37 via a resistor 39. Both of the terminals of the potentiometer 37 are connected with a highly constant source 41 of D.C. voltage. One of the terminals of the potentiometer 37 is grounded.

The purpose of the potentiometer 37 is to take into account factors which do not always remain constant, e.g. the sensitivity of the printing paper to a particular color and/or special characteristics of a particular type of film, and to store values corresponding to such factors. These values remain unchanged as long as the emulsion number of the printing paper remains the same and the same type of original is being processed. The potentiometer 37 and the corresponding potentiometers in the color channels 27 and 28 may be associated with data storage circuits which are switched as necessary, e.g. to compensate for a change from one type of film to another when data for both types of film are stored in the storage circuits.

The summing amplifier 36 has a negative feedback circuit which contains a resistor 38. The output of the summing amplifier 36 is connected with one of the two inputs of a comparator amplifier 40. The output of the comparator amplifier 40, in turn, is connected to the line 21 which leads to the relay 18 for the color filter 15.

The other input of the comparator amplifier 40 is connected with the output of a summing amplifier 46. One of the two inputs of the summing amplifier 46 receives a voltage signal which is the resultant of a plurality of voltage signals representing various factors taken into account during evaluation of the original 9. Thus, this input of the summing amplifier 46 is connected with the wiper 42a of a potentiometer 42 via a resistor 44 and with the wiper 43a of a potentiometer 43 via a resistor 45. The potentiometers 42 and 43, which are connected to the source 41 of constant potential, are adjustable and function as storage elements for data relating to factors taken into consideration during evaluation of the original 9. The input of the summing amplifier 46 connected with the potentiometers 42 and 43 also receives a voltage signal via a resistor 49 which is representative of an undercorrection factor for the color corresponding to the color channel 26.

The other input of the summing amplifier 46 also receives a voltage signal which is the resultant of a plurality of individual voltage signals representative of various characteristics of the original 9. In this case, however, the individual voltage signals come from the two other color channels 27 and 28. The individual voltage signals from the color channels 27 and 28, which are adjustable in dependence upon the characteristics of the original 9, are transmitted to the summing amplifier 46 via resistors 47 and 48. The resistors 47 and 48 are respectively connected with potentiometers in the color channels 27 and 28 corresponding to the potentiometers 42 and 43. The input of the summing amplifier 46 connected with the resistors 47 and 48 additionally receives a voltage signal via a resistor 50 which is indicative of a slope correction factor. The summing amplifier 46 has a feedback circuit containing a resistor 46a.

The voltage signal required to generate the undercorrection factor for the color corresponding to the color channel 26 is derived from the summing amplifier 36. In the illustrated position 31a of the switch 31, the output voltage of the summing amplifier 36 represents a logarithmic value indicative of the brightness of the original 9 in the color corresponding to the color channel 26 and hence of the deviation of the density of this color from the corresponding density of a calibrating original, e.g. a calibrating negative. The output voltage of the summing amplifier 36 is transmitted to a so-called sample and hold amplifier 51 via a resistor 52. The sample and hold amplifier 51 further receives a voltage signal from an adjustable potentiometer 53 having a wiper 53a which is connected with the sample and hold amplifier 51 via a resistor 54. The voltage signal from the potentiometer 53 is representative of a preset slope center. The resultant voltage signal fed into the sample and hold amplifier 51 is indicative of the difference between the density of the color corresponding to the color channel 26 and the slope center which represents the density of this color in the calibrating original. The sample and hold amplifier 51 stores the signal supplied to it for the duration of the measuring period, that is, for the period during which the switch 31 is in the position 31a and the density of the color of the original 9 corresponding to the color channel 26 is being determined. The sample and hold amplifier 51 subsequently emits this voltage signal during exposure of the original 9 which occurs when the switch 31 is switched to the position 31b.

The output of the sample and hold amplifier 51 is connected to one of the terminals of an undercorrection potentiometer 55 for the color corresponding to the color channel 26. Another terminal of the undercorrection potentiometer 55 is connected to a line 56 which, in turn, is connected with corresponding undercorrection potentiometers in the color channels 27 and 28. The line 56 accordingly carries a voltage signal which is representative of the average neutral gray density of the original 9.

The undercorrection potentiometer 55 has a wiper 55a which is mechanically linked to the wipers of the corresponding undercorrection potentiometers in the color channels 27 and 28 as indicated by the broken line 91. The link 91 is such that the wiper 55a can be moved in unison with and to the same extent as the corresponding wipers in the color channels 27 and 28. By adjusting the angular positions of the wiper 55a and the corresponding wipers in the color channels 27 and 28, these can be set to values varying between 0 and 1.

The wiper 55a is connected to one of the inputs of a summing amplifier 80 via a resistor 80a. This input of the summing amplifier 80 receives a base undercorrection signal having the same magnitude as that in U.S. Pat. No. 3,867,029. The base undercorrection signal lies on a base graph UK1 illustrated in FIG. 3 and increases linearly with increasing difference between the density of the color corresponding to the color channel 26 and the neutral gray density of the original 9.

Figure 3:
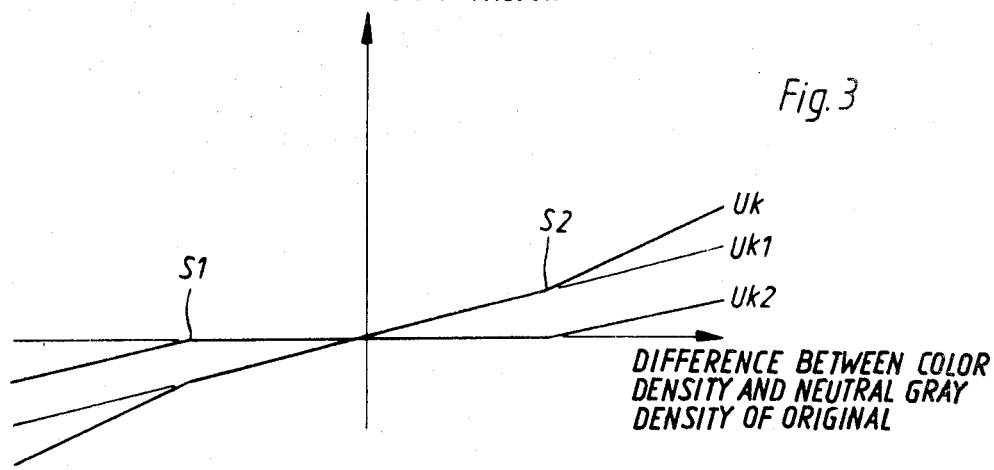
FIG. 3 is a plot of undercorrection factor versus difference between the average density of a color and the neutral gray density of an original and corresponds to the circuit of FIG. 2.

The summing amplifier 80 receives an additional undercorrection signal from a potentiometer 79. The potentiometer 79 has a wiper 79a which is connected with a second terminal of the summing amplifier 80 via a resistor 72. The additional undercorrection signal lies on an additional graph UK2 which is also shown in FIG. 3. The additional undercorrection signal remains at 0 until the difference between the color density and the neutral gray density reaches adjustable, predetermined threshold values S1 and S2. Beyond the threshold values S1 and S2, the additional undercorrection signal increases linearly with increasing difference between the color density and the neutral gray density. Accordingly, the sum of the graphs UK1 and UK2 yields a graph UK which is linear between and on either side of the threshold values S1 and S2 but has an abrupt bend or change in slope at the threshold values S1 and S2. The change in slope is such that the magnitude of the resultant undercorrection signal corresponding to the resultant graph UK exceeds the magnitude of the base undercorrection signal corresponding to the base graph UK1 beyond the threshold values S1 and S2. In other words, the rate of change of the undercorrection factor as a function of the difference between the color density and the neutral gray density is greater beyond the threshold values S1 and S2 than before.

The course of the additional graph UK2 is determined by a pair of comparator amplifiers 67 and 68 which function as threshold value generators. Each of the comparator amplifiers 67 and 68 has two inputs. One of the inputs of the comparator amplifier 67 is connected to the output of the sample and hold amplifier 51 via a resistor 67a while one input of the comparator amplifier 68 is connected to the output of the sample and hold amplifier 51 via a resistor 68a. The remaining input of the comparator amplifier 67 receives the voltage signal in the line 56 via the potentiometer 55 and a resistor 67b. Similarly, the remaining input of the comparator amplifier 68 receives the voltage signal in the line 56 via the potentiometer 55 and a resistor 68b. The voltage signal in the line 56, which is representative of the average netural gray density of the original 9, is reduced or modified by the undercorrection potentiometer 55 so that the voltage signals which arrive at the comparator amplifiers 67 and 68 from the line 56 are modified voltage signals indicative of the average neutral gray density of the original 9.

An adjustable potentiometer 69 has a tap between the comparator amplifier 67 and the resistor 67b. Likewise, an adjustable potentiometer 70 has a tap located between the comparator amplifier 68 and the resistor 68b. Adjustment of the potentiometers 68 and 70 sets the respective threshold values S1 and S2 of FIG. 3.

The output of the comparator amplifier 67 is connected with a signal limiting circuit consisting of resistors 89,90 and 71 as well as a transistor 73. The output of the comparator amplifier 68 is similarly connected to a signal limiting circuit consisting of resistors 74,75 and 76 as well as a transistor 77. Both signal limiting circuits are connected to one of the two inputs of an intermediate summing amplifier 78. The second input of the intermediate summing amplifier 78 is connected to ground via a resistor 78a. The output of the intermediate summing amplifier 78 is, in turn, connected to the potentiometer 79 which supplies the additional undercorrection signal corresponding to the additional graph UK2 to the summing amplifier 80. The signal limiting circuits connected with the outputs of the comparator amplifiers 67 and 68 prevent the intermediate summing amplifier 78 from emitting a signal until a threshold value S1 or S2 has been reached. Thus, there is no increase in the magnitude of the base undercorrection signal beyond the base graph UK1 until either the threshold value S1 or the threshold values S2 has been exceeded. Once this occurs, the magnitude of the base undercorrection signal corresponding to the base graph UK1 is increased by the magnitude of the additional undercorrection signal corresponding to the additional graph UK2. The potentiometer 79 functions to weight the base undercorrection signal and the additional undercorrection signal.

The summing amplifier 80 has a third input which is connected with a pair of lines 84 and 85 having respective resistors 81 and 82. The lines 84 and 85 are respectively connected with the wipers of potentiometers in the color channels 27 and 28 corresponding to the potentiometer 79. The resistances of the resistors 81 and 82 are selected in such a manner relative to the resistance of the resistor 72 between the potentiometer 79 and the summing amplifier 80 that the overall density of the copy obtained from the original 9 is not affected by the additional undercorrection signal corresponding to the graph UK2. In other words, the summing amplifier 80 receives signals representing the additional undercorrection factors in the color channels 27 and 28 for the purpose of balancing the density of the copy obtained from the original 9. The intensities of the signals arriving at the summing amplifier 80 from the color channels 27 and 28 will generally be less than the intensity of the signal received by the summing amplifier 80 from the potentiometer 79. The resistances of the resistors 81 and 82 are preferably exactly double the resistance of the resistor 72 so that the intensity of the signal reaching the summing amplifier 80 from each of the color channels 27 and 28 is equal to one-third the intensity of the signal arriving at the summing amplifier 80 from the potentiometer 79.

A line 83 leading to the color channels 27 and 28 has a tap between the potentiometer 79 and the resistor 72. The line 83 is equivalent to the lines 84 and 85 and serves to carry signals representative of the additional undercorrection factor for the color channel 26 to the summing amplifiers in the color channels 27 and 28 corresponding to the summing amplifier 80.

The output of the summing amplifier 80 is connected with one of the two inputs of another amplifier 57 via a resistor 80b. This input of the amplifier 57 is grounded through a resistor 57a. The other input of the amplifier 57 receives the voltage signal which is generated in the line 56 and is representative of the neutral gray density of the original 9 via a resistor 57b. The amplifier 57, which functions as an impedance transformer, transmits a signal indicative of the sum of the base undercorrection signal and the additional undercorrection signal to the summing amplifier 46 via the resistor 49. The amplifier 57 has a feedback circuit which contains a resistor 57c.

The voltage signal delivered by the amplifier 57 is representative of the resultant undercorrection factor corresponding to the graph UK and directly proportional to the angular setting of the wiper 55a of the potentiometer 55. Thus, the potentiometer 55 operates on the voltage signals representative of the base undercorrection factor and the additional undercorrection factor using a parameter which is variable between 0 and 1. On the one hand, the voltage signal delivered by the amplifier 57 is proportional to the deviation of the density of the color corresponding to the color channel 26 from the density of the same color in the calibrating original. On the other hand, the voltage signal delivered by the amplifier 57 is proportional to the average of the density deviations of the three colors corresponding to the color channels 26–28 from the corresponding densities of the calibrating original. By adjusting the position of the wiper 55a of the potentiometer 55, the voltage signals representative of the base undercorrection factor and the additional undercorrection factor may be multiplied by any value between 0 and 1 before being transmitted to the summing amplifier 46 via the amplifier 57. In accordance with the equation I (intensity)×T (Time)=C (constant), no undercorrection occurs when the wiper 55a is set to 0. On the other hand, when the wiper 55a is set to 1, the undercorrection factor for the color corresponding to the color channel 26 is such that the deviation of the density of this color from the average neutral gray density of the original 9 is not taken into account. The exposure in the color corresponding to the color channel 26 is then performed according to the equation T=C.

A summing amplifier 58 is provided for supplying a voltage signal indicative of the slope and has a feedback circuit containing a resistor 58e. The summing amplifier 58 has a pair of inputs of which one is connected with the output of the sample and hold amplifier 51 via a resistor 58a and with the line 56 via a resistor 58b. The sample and hold amplifier 51 supplies a signal representative of the density of the color corresponding to the color channel 26 while the line 56 supplies a signal indicative of the neutral gray density of the original 9. The signal at the input of the summing amplifier 58 which is connected with the sample and hold amplifier 51 and the line 56 thus represents the deviation of the density of the color corresponding to the color channel 26 from the neutral gray density of the original 9. The other input of the summing amplifier 58 is connected to ground via a resistor 58c.

The output of the summing amplifier 58 is connected to one of the terminals of an adjustable potentiometer 59 having a wiper 59a as well as one of the terminals of an adjustable potentiometer 60 having a wiper 60a. Each of the potentiometers 59 and 60 has another terminal which leads to a common tap 92.

The output of the summing amplifier 58 is further connected with the input of an inverting amplifier 61 via a resistor 58d. The output of the inverting amplifier 61, in turn, is connected with the common tap 92 of the potentiometers 59 and 60. The inverting amplifier 61 functions to invert the output signal of the summing amplifier 58 so that, depending upon the settings of the potentiometers 59 and 60, a positive or negative voltage signal of adjustable magnitude is generated at the tap 92. The inverting amplifier 61 has a feedback circuit which contains a resistor 61a.

The output of the summing amplifier 58 is additionally connected with one of the two inputs of a comparator amplifier 62. The other input of the comparator amplifier 62 is connected to ground. The output of the comparator amplifier 62 leads to a switch 63 which is controlled by the comparator amplifier 62. The switch 63 may be selectively connected with the wiper 59a of the potentiometer 59 and the wiper 60a of the potentiometer 60. The wipers 59a and 60a of the respective potentiometers 59 and 60 may thus be selectively placed in communication with the input of an amplifier 64 via a resistor 64a. The amplifier 64 serves an an impedance transformer. The output of the amplifier 64 is connected with the resistor 50 which, as discussed previously, is connected with one of the inputs of the summing amplifier 46.

Depending on the positions of the wipers 59a and 60a of the respective potentiometers 59 and 60, the voltage signal emitted by the summing amplifier 58 is multiplied by a value between +1 and −1. The comparator amplifier 62 determines the sign or polarity of the voltage signal supplied by the summing amplifier 58. When the voltage signal is positive indicating overexposure of the original 9, the comparator amplifier 62 causes the switch 63 to be connected with one of the wipers 59a or 60a. On the other hand, when the voltage signal emitted by the summing amplifier 58 is negative thereby indicating underexposure of the original 9, the comparator amplifier 62 causes the switch 63 to be connected with the other wiper 59a or 60a. This makes it possible to expose underexposed and overexposed originals with different slopes which enables a greater proportion of satisfactory initial copies to be obtained.

The operation of the copier is as follows:

In the starting condition, the shutter 12a is closed and the switch 31 is in the position 31a. The color filters 15,16 and 17 are out of the light path. The color filters 6,7 and 8 extend into the light path to such a degree that the exposure times for the three colors corresponding to the color filters 6-8 are identical for a calibrating original having a predetermined color composition. The potentiometer 37 in the color channel 26 and the corresponding potentiometers in the color channels 27 and 28 are adjusted to reflect the sensitivities of the original 9 and the printing material 14 in the respective colors. The potentiometers 55,59 and 60 in the color channel 26, as well as the corresponding potentiometers in the color channels 27 and 28, are adjusted by the operator on the basis of previous experience to reflect the particular type of originals 9 to be processed and remain unchanged during the subsequent copying operations. The wipers 59a and 60a of the potentiometers 59 and 60 may be adjusted simultaneously with the wipers of the corresponding potentiometers in the color channels 27 and 28 in the same manner as the wiper 55a of the potentiometer 55 may be adjusted simultaneously with the wipers of the corresponding potentiometers in the color channels 27 and 28.

The photodetectors 10 for the color channel 26 sense the intensity of the corresponding colored light which is transmitted through the original 9 to be copied. The photodetectors 10 generate a signal which is transmitted through the operational amplifier 29 and the logarithmic amplifier 35 to the summing amplifier 36. The latter emits a signal representative of the density of the original 9 in the color corresponding to the color channel 26. This signal is sent to the comparator amplifier 40 and the sample and hold amplifier 51. The signal transmitted to the sample and hold amplifier 51 is combined with a signal from the potentiometer 53 which was previously adjusted to reflect the density of the calibrating original in the color corresponding to the color channel 26. The sample and hold amplifier 51 thus receives a signal which is indicative of the difference between the density of the original 9 in the color corresponding to the color channel 26 and the density of the calibrating original in this color. The sample and hold amplifier 51 stores such signal until the exposure of the original 9 which is now in the light path has been completed. The comparator amplifier 62 is able, even at this stage of the measurements which are performed prior to beginning the exposure of the original 9, to determine whether the original 9 is overexposed or underexposed and to connect the switch 63 with the appropriate one of the potentiometers 59 and 60.

When the shutter 12a is opened to begin exposure of the original 9, the switch 31 moves to the position 31b thereby placing the RC link in circuit with the operational amplifier 29. This causes the voltage across the plates of the condenser 32 in the RC link to begin increasing. The resistor 33 in the RC link provides a delaying action which compensates for the delay in initiating movement of the filter 15 corresponding to the color channel 26.

The increase in voltage at the input of the logarithmic amplifier 35 due to the voltage increase across the condenser 32 results in a voltage increase at that input of the comparator amplifier 40 which is connected with the summing amplifier 36. The other input of the comparator amplifier 40, which is connected with the output of the summing amplifier 46, receives a signal which is representative of the brightness of the original 9 or of the stored signal in the sample and hold amplifier 51 representing the deviation of the density of the original in the color corresponding to the color channel 26 from the density of this color in the calibrating original. The summing amplifier 46 sums the voltage signals which arrive at its inputs and transmits the total of these voltage signals to the comparator amplifier 40. When the signals at the two inputs of the comparator amplifier 40 are equal, an impulse is delivered to the relay 18 via the line 21. The relay 18 then moves the filter 15 into the light path thereby terminating the exposure in the color corresponding to the color channel 26.

The color undercorrection signals at the outputs of the summing amplifier 80 and the corresponding amplifiers in the color channels 27 and 28 are the same as those in the apparatus of U.S. Pat. No. 3,867,029 when the deviations of the densities of the respective colors of the original 9 from the neutral gray density of the latter have magnitudes smaller than the threshold values S1 and S2. An additional undercorrection voltage signal which enables a better reproduction of color dominants to be achieved is generated when the threshold values S1 and S2 are exceeded in at least one color. The threshold values S1 and S2 need not be adjusted so as to be symmetrical with respect to 0. Thus, practical copying results have indicated that the magnitudes of the threshold values S1 and S2 may be different. Advantageously, the threshold values S1 and S2 lie in the region of about 10% deviation of the density of the respective color in the original 9 from the average neutral gray density thereof. Depending upon the manner in which the original 9 is exposed and upon the copying results, the resultant undercorrection factor beyond the threshold values S1 and S2 favorably exceeds the base undercorrection factor by about 5 to 25%. Preferably, the resultant undercorrection factor beyond the threshold values S1 and S2 is 10 to 15% greater then the base undercorrection factor.

In the embodiment of FIG. 2, an individual undercorrection factor is calculated and used for each of the color channels 26-28. However, it is possible to change, and particularly to decrease, the neutral gray correction factor in such a manner as to obtain an additional undercorrection factor which is common to and determined by all three color channels 26-28. This may be achieved by appropriately changing the connections established between the color channels 26-28 via the lines 83-85 and by suitably modifying the circuitry of the summing amplifier 80 in the color channel 26 and the corresponding summing amplifiers in the color channels 27 and 28. In this case, the common additional undercorrection factor may be an average of the additional undercorrection factors for the three color channels 26-28 and, likewise, the common resultant undercorrection factor used may be an average of the resultant undercorrection factors for the color channels 26-28.

Figure 4:
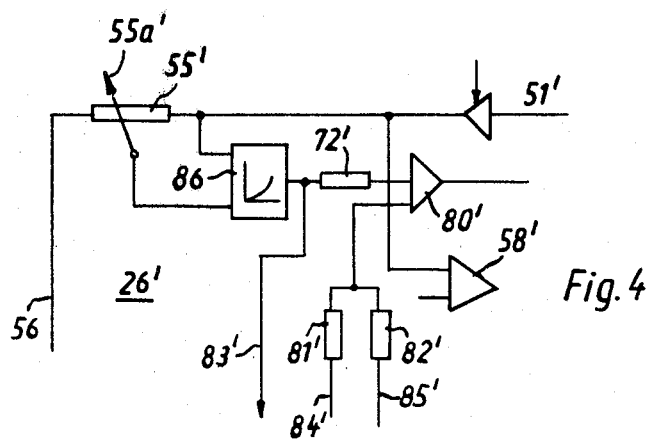
FIG. 4 illustrates another embodiment of a circuit for use in the copier of FIG. 1.

FIG. 4 shows another embodiment of a circuit which may be used to generate an undercorrection voltage signal. In FIG. 4, the same reference numerals as in FIG. 2 but with primes are used to denote similar elements. The adjustable circuit elements of FIG. 2 for determining the threshold values S1 and S2 and generating the signals corresponding to the graph UK2 are replaced by a logarithmic signal generator 86' in FIG. 4. The signal generator 86', which forms part of a color channel 26', has an input which is connected with the output of a sample and hold amplifier 51' and another input which is connected with the wiper 55a' of a potentiometer 55'. Accordingly, the signal generator 86' receives a signal from the sample and hold amplifier 51' which represents the deviation of the density of the respective color in the original 9 from the density of the same color in a calibrating original. The signal generator 86' further receives a signal from a line 56' which is modified or reduced by the potentiometer 55' and is indicative of the neutral gray density of the original 9. The signal generator 86' generates an undercorrection signal which is a function of the difference between the two signals at its inputs and lies on an exponential graph. A signal generator of this type may, for example, be constituted by an analog operational amplifier having a feedback circuit containing a diode. The output signal of the signal generator 86' is delivered directly to one of the two inputs of a summing amplifier 80' via a resistor 72'. The summing amplifier 80' is equivalent to the summing amplifier 80 of FIG. 2. The other input of the summing amplifier 80' is, as before, connected to two further color channels via lines 84' and 85' having respective resistors 81' and 82'.

Figure 5:
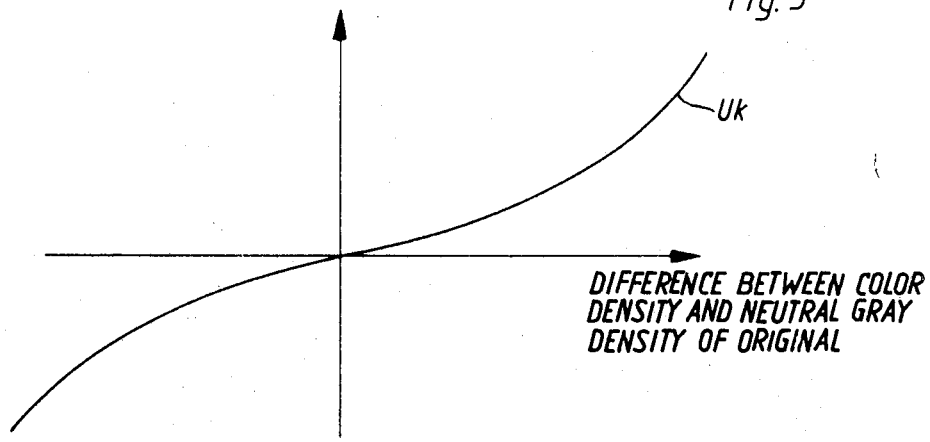
FIG. 5 is a plot similar to FIG. 3 but corresponding to the circuit of FIG. 4.

FIG. 5 shows the graph of the signal emitted by the signal generator 86'. It will be observed that the magnitude of the undercorrection factor increases continuously with increasing deviation of the density of a color of the original 9 from the neutral gray density thereof.

In the embodiments described above, the exposure of the original 9 is begun simultaneously for each of the three colors corresponding to the various color channels. The exposure in each color is controlled individually by the respective color channel and is terminated after the proper amount of light has passed through the original 9 by moving the associated color filter 15-17 into the light path. The preceding correction procedure may, however, be used to regulate the intensity of the light during exposure. Thus, it is possible to expose the original 9 in such a manner that the exposure times for the three colors corresponding to the different color channels are equal while the intensities of the different colors are varied by moving the respective color filters 6-8 into the light path to varying degrees. The undercorrection signal may be generated as outlined above and used to control the movement of the color filters 6-8 into and out of the light path.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An exposure control method for color copying, particularly for use in automatic exposure control of photographic color copiers, comprising the steps of:
   (a) determining the average color density of a predetermined color of an original to be copied;
   (b) determining the average neutral gray density of said original;
   (c) establishing the deviation of said color density from said neutral gray density; and
   (d) controlling the exposure of said original in said predetermined color during copying in dependence upon said deviation using a correction factor from a graph of correction factor versus deviation having at least one change in slope.

2. A method as defined in claim 1, wherein said steps are performed for two additional colors of said original.

3. A method as defined in claim 2, wherein said colors are red, green and blue.

4. A method as defined in claim 2, comprising the steps of generating signals representative of the correction factors for each of said colors; and modifying the signal for each color by the signals of the other two colors so as to balance the density in a copy obtained from said original.

5. A method as defined in claim 2, wherein said controlling steps are performed using a correction factor which is an average of the correction factors for said colors.

6. A method as defined in claim 1, wherein said correction factor is effective to at least partially eliminate said deviation in a copy obtained from said original.

7. A method as defined in claim 1, wherein said correction factor is effective to reproduce said deviation in a copy obtained from said original.

8. A method as defined in claim 1, wherein the magnitude of said correction factor increases more rapidly with increasing deviation after passing through said change in slope in a direction of increasing magnitude of deviation than before.

9. A method as defined in claim 1, wherein said change in slope occurs at a predetermined magnitude of deviation.

10. A method as defined in claim 9, wherein said predetermined magnitude is in the region of about 10%.

11. A method as defined in claim 1, wherein the position of said change in slope on said graph is adjustable.

12. A method as defined in claim 1, wherein the magnitude of said correction factor increases by about 5 to 25% after passing through said change in slope in a direction of increasing magnitude of deviation.

13. A method as defined in claim 12, wherein the magnitude of said correction factor increases by about 10 to 15% after passing through said change in slope in a direction of increasing magnitude of deviation.

14. A method as defined in claim 1, wherein the magnitude of said correction factor increases continuously with increasing magnitude of deviation.

15. A method as defined in claim 1, wherein said graph represents an exponential function.

16. A method as defined in claim 1, wherein the slope of said graph increases continuously with increasing magnitude of deviation.

17. A color copier, particularly a photographic color copier, comprising:
   (a) means for determining the average color density of a predetermined color and the average neutral gray density of an original to be copied;
   (b) means for establishing the deviation of the color density from the neutral gray density and assigning a correction factor from a graph of correction factor versus deviation having at least one change in slope; and
   (c) means for controlling the exposure of the original in the predetermined color during copying using the correction factor.

18. A color copier as defined in claim 17, comprising a source of base signals representative of a base correction factor; and wherein said establishing and assigning means includes adjusting means for setting the change in slope at a predetermined value of the deviation of the color density from the neutral gray density, said establishing and assigning means further including comparing means for comparing the deviation of the color density from the neutral gray density with the predetermined deviation value, and said establishing and assigning means also including an additional source of signals operative to generate an additional signal representative of an additional correction factor when the deviation of the color density from the neutral gray density exceeds the predetermined deviation value.

19. A color copier as defined in claim 17, wherein said determining means comprises generating means for generating signals indicative of the color density and neutral gray density, and said establishing and assigning means comprises comparing means for comparing the signals.

20. A color copier as defined in claim 17, wherein said controlling means comprises a comparator for comparing a signal representative of the color density of the predetermined color with a signal representative of the correction factor.

21. A color copier as defined in claim 17, wherein said establishing and assigning means comprises an electronic circuit for generating a signal representative of the correction factor.

22. A color copier as defined in claim 17, wherein the magnitude of the correction factor increases more rapidly with increasing magnitude of deviation after passing through the change in slope in a direction of increasing magnitude of deviation than before.

23. A color copier as defined in claim 17, wherein the change in slope occurs at a predetermined magnitude of deviation.

24. A color copier as defined in claim 23, wherein the predetermined magnitude is in the region of about 10%.

25. A color copier as defined in claim 17, wherein said establishing and assigning means comprises adjusting means for adjusting the position of the change in slope on the graph.

26. A color copier as defined in claim 17, wherein the magnitude of the correction factor increases by about 5 to 25% after passing through the change in slope in a direction of increasing magnitude of deviation.

27. A color copier as defined in claim 26, wherein the magnitude of the correction factor increases by about 10 to 15% after passing through the change in slope in a direction of increasing magnitude of deviation.

28. A color copier as defined in claim 17, wherein the magnitude of the correction factor increases continuously with increasing magnitude of deviation.

29. A color copier as defined in claim 17, wherein the slope of the graph increases continuously with increasing magnitude of deviation.

30. A color copier as defined in claim 17, wherein said establishing and assigning means comprises an exponential signal generator for generating a signal representative of the correction factor.

31. A color copier as defined in claim 17, wherein said controlling means responds to the correction factor by at least partially eliminating the deviation of the color density from the neutral gray density in a copy obtained from the original.

32. A color copier as defined in claim 17, wherein said controlling means responds to the correction factor by reproducing the deviation of the color density from the neutral gray density in a copy obtained from the original.

33. A color copier as defined in claim 17, wherein said determining means, establishing and assigning means and controlling means constitute part of a first color channel for the predetermined color; and further comprising second and third color channels for two additional colors, each of said second and third color channels including counterparts of said determining means, establishing and assigning means and controlling means for the respective color.

34. A color copier as defined in claim 33, wherein each of said determining means includes photodetecting means sensitive to the respective color, said photodetecting means being arranged to transmit signals representative of the respective color density to the respective controlling means.

35. A color copier as defined in claim 33, wherein each of said color channels comprises a source of base signals representative of a base correction factor, said establishing and assigning means each including a pair of adjusting devices for setting two changes in slope on the respective graph at predetermined values of deviation of the respective color density from the neutral gray density, and each of said establishing and assigning means further including a pair of comparator amplifiers for comparing the deviation of the respective color density from the neutral gray density with the respective predetermined deviation values, each of said establishing and assigning means also including an additional source of signals operative to generate an additional signal representative of an additional correction factor when the deviation of the respective color density from the neutral gray density exceeds a respective predetermined deviation value.

36. A color copier as defined in claim 33, wherein each of said color channels comprises a summing amplifier arranged to receive a signal representative of the respective correction factor, each of said summing amplifiers also being arranged to receive signals representative of the correction factors in the other two color channels so as to balance the density of a copy obtained from the original.

37. A color copier as defined in claim 36, wherein the signals received by each of said summing amplifiers from the other two color channels have one-third the intensity of the corresponding signals within the respective color channels.

38. A color copier as defined in claim 33, wherein said color channels are red, green and blue channels, respectively.

* * * * *